(12) United States Patent
Goettel et al.

(10) Patent No.: US 6,644,934 B2
(45) Date of Patent: Nov. 11, 2003

(54) AFTERCOOLER BYPASS MEANS FOR A LOCOMOTIVE COMPRESSED AIR SYSTEM

(75) Inventors: Walter E. Goettel, Monogahela, PA (US); Brian L. Cunkelman, Blairsville, PA (US); Daniel G. Wagner, Pittsburgh, PA (US); Roger Drummond, Hermine, PA (US)

(73) Assignee: Westinghouse air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/902,192

(22) Filed: Jul. 10, 2001

(65) Prior Publication Data

US 2001/0044273 A1 Nov. 22, 2001

Related U.S. Application Data

(62) Division of application No. 08/897,277, filed on Jul. 21, 1997, now Pat. No. 6,283,725.

(51) Int. Cl.⁷ ............... F02B 33/00; F04B 23/00
(52) U.S. Cl. ............... 417/243; 123/563; 417/292
(58) Field of Search ............... 417/243, 292; 123/563; 165/103, 298; 62/80, 93, 90

(56) References Cited

U.S. PATENT DOCUMENTS

| 1,751,623 A | * | 3/1930 | Dewnison | 165/103 |
| 2,209,097 A | * | 7/1940 | Villette | 165/103 X |
| 2,340,397 A | * | 2/1944 | McNeal | 165/103 X |
| 5,566,881 A | * | 10/1996 | Inoue et al. | 165/284 |

* cited by examiner

Primary Examiner—William Wayner
(74) Attorney, Agent, or Firm—James Ray & Associates

(57) ABSTRACT

Method and apparatus for heating gases cooled by an aftercooler that receives hot gases from a compressor. The method includes the steps of directing at least a portion of said hot gases to means for bypassing the aftercooler, and using the bypass means to direct hot gases to a location that receives cooled gases from the aftercooler. The hot gases are used at the location to heat the cooled gases when ambient temperature is at or below freezing, and are used downstream from the aftercooler when moisture freezes in the aftercooler.

2 Claims, 3 Drawing Sheets

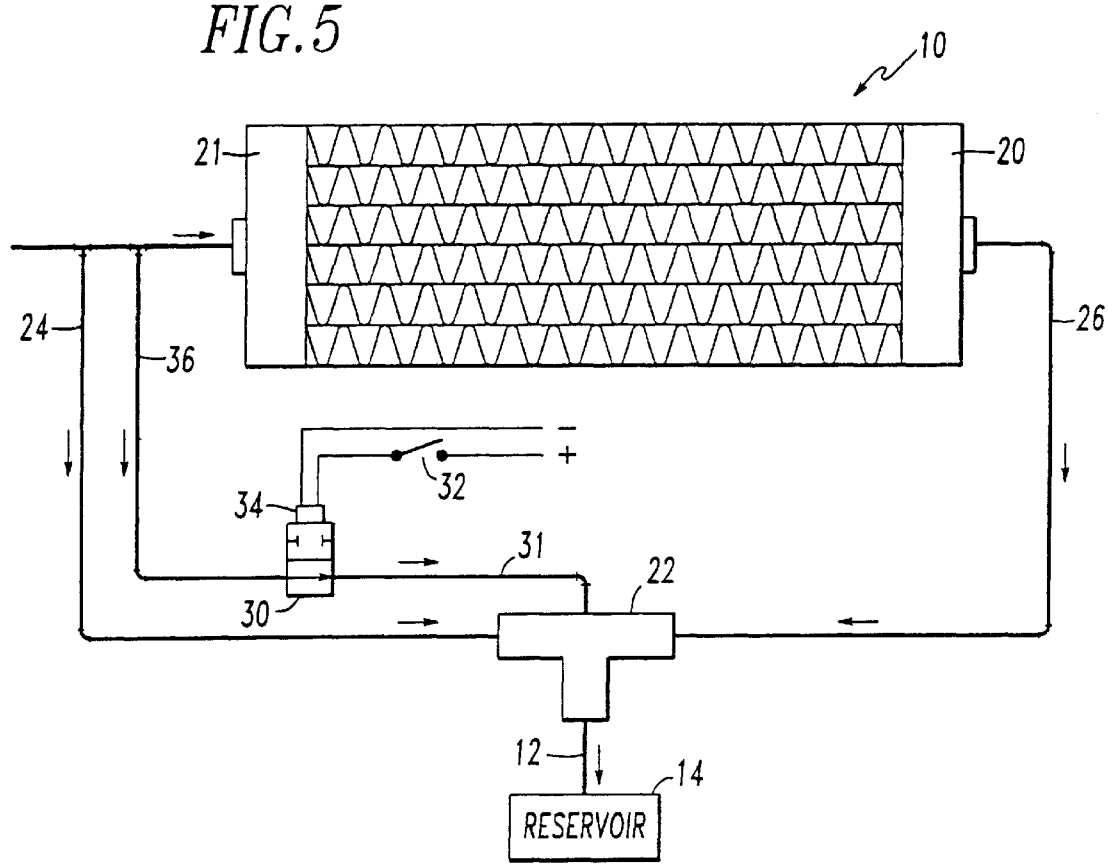
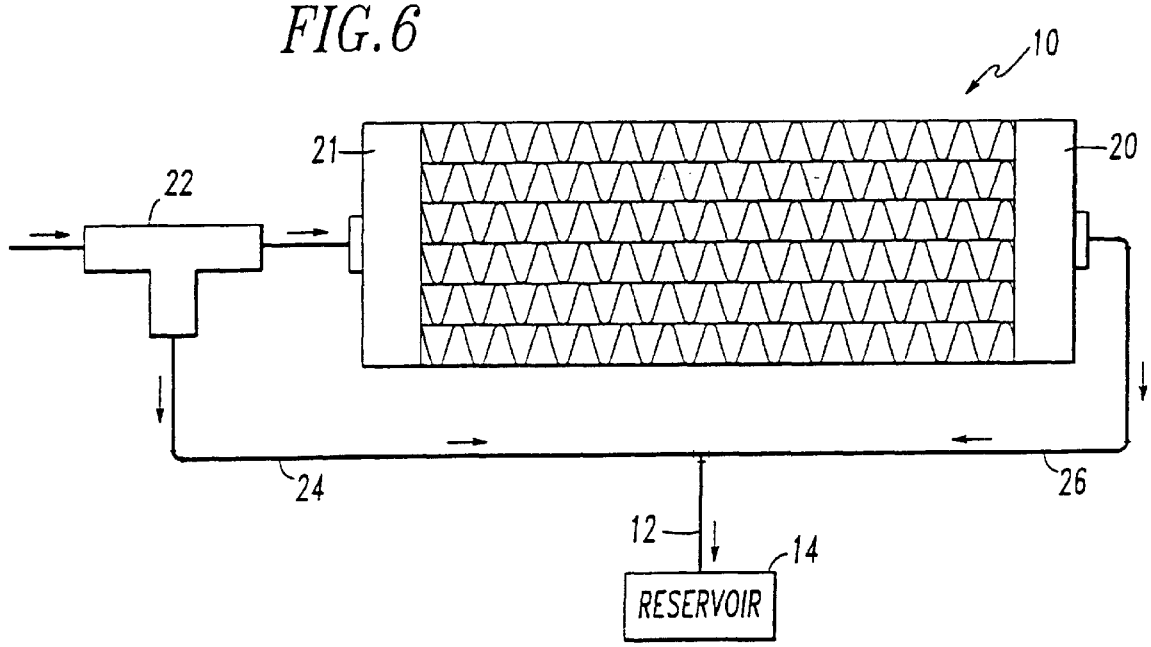

AFTERCOOLER BYPASS MEANS FOR A LOCOMOTIVE COMPRESSED AIR SYSTEM

CROSS-REFERENCE TO RELATED APPLICATIONS

This application is a Divisional application of patent application Ser. No. 08/897,277 filed Jul. 21, 1997, now U.S. Pat. No. 6,283,725.

FIELD OF INVENTION

The invention relates generally to locomotive air compressors and aftercoolers used to substantially reduce the temperature of high pressure air exiting the compressor, and particularly to a means for preventing downstream freezing of condensate in the high pressure air when outside ambient conditions are at or below freezing.

BACKGROUND OF INVENTION

U.S. Pat. No. 5,106,270 to Goettel et al., and assigned to the assignee of the present invention, shows an integral compressor and aftercooler that is extremely efficient in cooling hot, high pressure discharge air from a compressor. When the compressor is operating under a heavy duty cycle the air temperature is reduced to within 2° of ambient temperature. If the compressor is running in a start/stop manner under a light duty cycle, the temperatures of the heated gases from the compressor can be reduced to temperatures within 5° of ambient. With such efficiency it is quite possible for moisture contained in the aftercooler or in the discharge air from the aftercooler to freeze when operating under freezing conditions.

SUMMARY OF THE INVENTION

The present invention provides a means to increase airstream temperatures flowing from an aftercooler to essentially remove the possibility of freezing prior to reaching a reservoir of pressurized air or bypass the aftercooler altogether should freezing occur in the aftercooler. The reservoir is typically fitted with a heated drain valve that removes (drains) condensate from the reservoir. The freezing problem is solved by bypassing the aftercooler with at least a portion of the hot air issuing from the compressor and directing the hot air to exhaust piping of the aftercooler. If the aftercooler freezes, all hot air is bypassed. In either case, warm air is supplied to the reservoir.

In one embodiment of the invention, by-pass of the aftercooler can be effected by a pipe connected between the compressor and aftercooler exhaust. The pipe provides a constant volume of hot, compressed air flow from the compressor to the aftercooler exhaust.

In another embodiment of the invention, a three-way valve is used to mix gases exhausting from the high pressure head of the air compressor and from an aftercooler to provide the warmer airstream. In both embodiments, condensate is prevented from freezing in the aftercooler exhaust and thus remains in liquid form long enough to reach the reservoir and the heated drain valve.

The three-way valve can be operated by sensing either the main reservoir inlet temperature or more simply ambient air temperature. Thus, in nonfreezing conditions, the three-way valve directs all high pressure air through the aftercooler so that it can be cooled and any moisture therein condensed. If, on the other hand ambient temperature falls below a certain level, the three-way valve is operated by temperature sensing means to bypass at least a portion of the high pressure air leaving the compressor.

OBJECTS OF THE INVENTION

It is, therefore, one of the primary objects of the present invention to provide a method and an apparatus to prevent freezing of condensate in high pressure air before it reaches a main reservoir in a locomotive and train braking system.

Another object of the present invention is to provide a method and an apparatus which provides a constant low volume flow of hot exhaust gases from a compressor directly to aftercooler exhaust piping, the aftercooler being connected to receive the major portion of hot gases from the compressor for cooling.

Yet another object of the present invention is to provide a method and an apparatus using a three-way valve that is effective in bypassing an aftercooler when freezing temperatures are sensed.

In addition to the various objects and advantage of the invention described above, various additional objects and advantages of the invention will become more readily apparent to those persons skilled in the pneumatic art from the following more detailed description of the invention, particularly, when such description is taken in conjunction with the attached drawing Figures and the appended claims.

BRIEF DESCRIPTION OF THE DRAWINGS

FIG. 5 is a schematic diagram showing a three-way valve operated by a magnet valve under control of a temperature signal, and FIG. 6 shows an embodiment wherein the three-way valve is located at the input side of the aftercooler.

Figure 2:
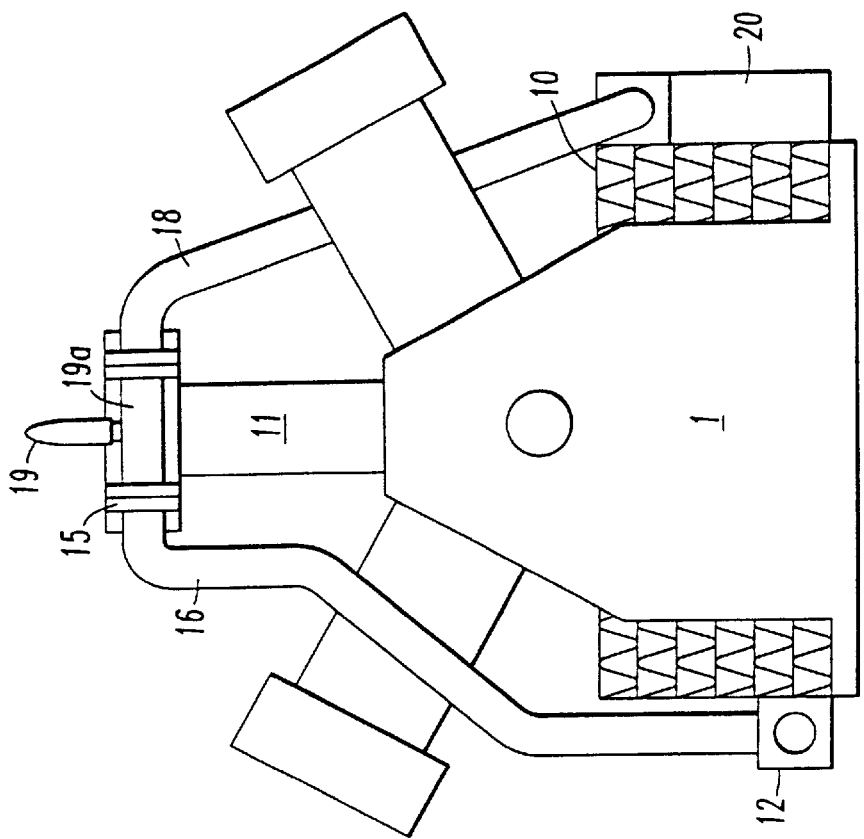
FIG. 2 is a diagrammatic front elevation view of the compressor and by-pass pipe of FIG. 1.

BRIEF DESCRIPTION OF A PRESENTLY PREFERRED AND VARIOUS ALTERNATIVE EMBODIMENTS OF THE INVENTION

Prior to proceeding to the much more detailed description of the present invention, it should be noted that identical reference numerals are used throughout the several views illustrated in the drawing figures to designate identical components, having identical functions, for the sake of clarity and understanding of the invention.

Figure 1:
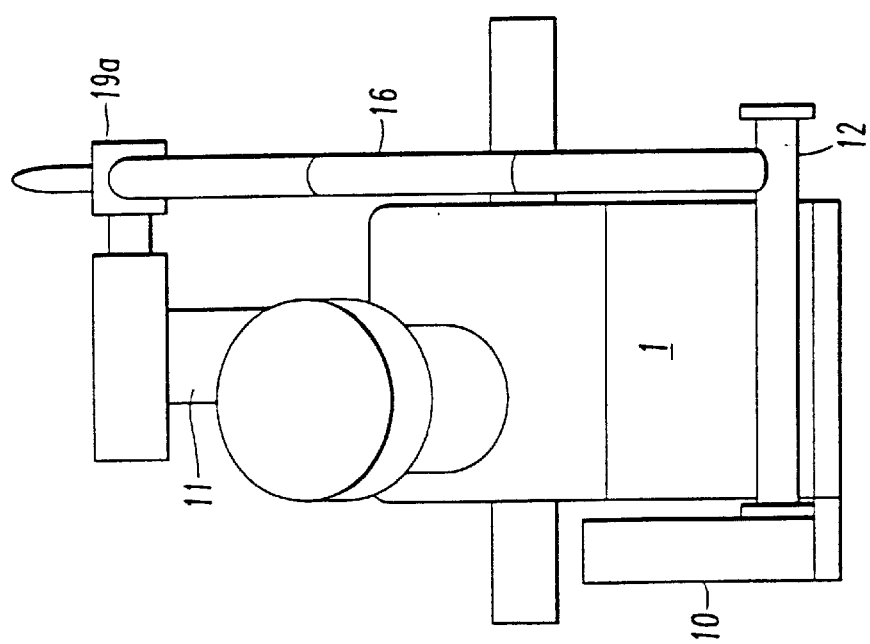
FIG. 1 is a diagrammatic side elevation view of a compressor provided with a pipe for by passing hot gases to an aftercooler exhaust.

Referring now to diagrammatic FIG. 1, an aftercooler 10 is shown connected to a source of hot high pressure compressed air, such as the high pressure cylinder 11 of the multi-cylinder compressor 1, which is shown in the above referenced Goettel et al. patent. In the Goettel et al Patent, hot high pressure air enters an aftercooler to be reduced in temperature for the purpose of condensing water vapor contained in the air to liquid water before the air is used to operate the brakes of a railroad train. As discussed earlier, when operating a compressor and aftercooler in cold temperatures, freezing of water in exhaust piping 12 of the aftercooler can take place. Moisture may also freeze in the aftercooler. If the amount of water in the high pressure air is substantial and freezes, it can block aftercooler tubing and exhaust piping such that the pressurized air needed for brake operation is not available. The aftercooler supplies the reduced temperature, high pressure air to a main reservoir or reservoirs 14, in FIG. 3, on a locomotive where liquid water is drained from the reservoir before the pressurized air is made available for operating the brakes of the train.

The present invention provides a means to increase airstream temperature before reaching reservoir 14 to avoid the freezing problem while still reducing substantially the water content in brake air. The reservoir 14 itself is typically provided with a heated drain (not shown) so that condensate can be removed even under freezing conditions.

In one embodiment of the invention, air stream temperature in piping 12 is increased by use of a simple bypass pipe 16. Bypass pipe 16 is connected to high pressure cylinder 11 on one end and is between such high pressure cylinder 11 and such predetermined location for receiving cooled gases from the aftercooler 10 which is exhaust pipe 12. Pipe 16 bypasses aftercooler 10 to outlet fitting and pipe 12 such that a portion of hot gases from cylinder 11 are directed to the fitting and pipe 12, the amount of hot gases by-passed depending on the internal size of the pipe. The major portion of the hot gases are sent directly to aftercooler 10, via a pipe 18 in FIG. 2, for cooling. Pipe 18 is connected to a header 20 (FIG. 1) on the input side of the aftercooler. A second header 21, visible in FIGS. 3 to 5, feeds cooled gases to exhaust outlet and pipe 12.

Pipe 16 provides a limited but substantially constant flow of hot gases to exhaust pipe 12, which gases then mix with the cooled gases exiting aftercooler 10, in pipe 12, to warm the same and thereby prevent freezing of condensate in the cooled gases when ambient temperature is at or below freezing. The aftercooler, of course, provides the bulk of the high pressure air for brake operation, which air is substantially free of water, as the aftercooler reduces air temperature to condense water vapor in the high pressure air to liquid water for draining from reservoir 14.

A safety valve 19 is, as shown in FIG. 2, connected to a center "T" fitting 19A that divides hot gas floe from cylinder 11 between pipe 16 and pipe 18. The safety valve 19 is employed to release air to atmosphere at a certain air pressure in fitting 19A. If moisture freezes in aftercooler 10, the internal diameter of pipe 16 provides a constant flow of hot gases from cylinder 11 sufficient to prevent operation of the safety valve 19, all of the compressed air now bypasses the aftercooler and flows directly to the reservoir 14. The supply of compressed air is thereby uninterrupted and safety of the train is in tact, as compressed air is available for braking.

Figure 3:
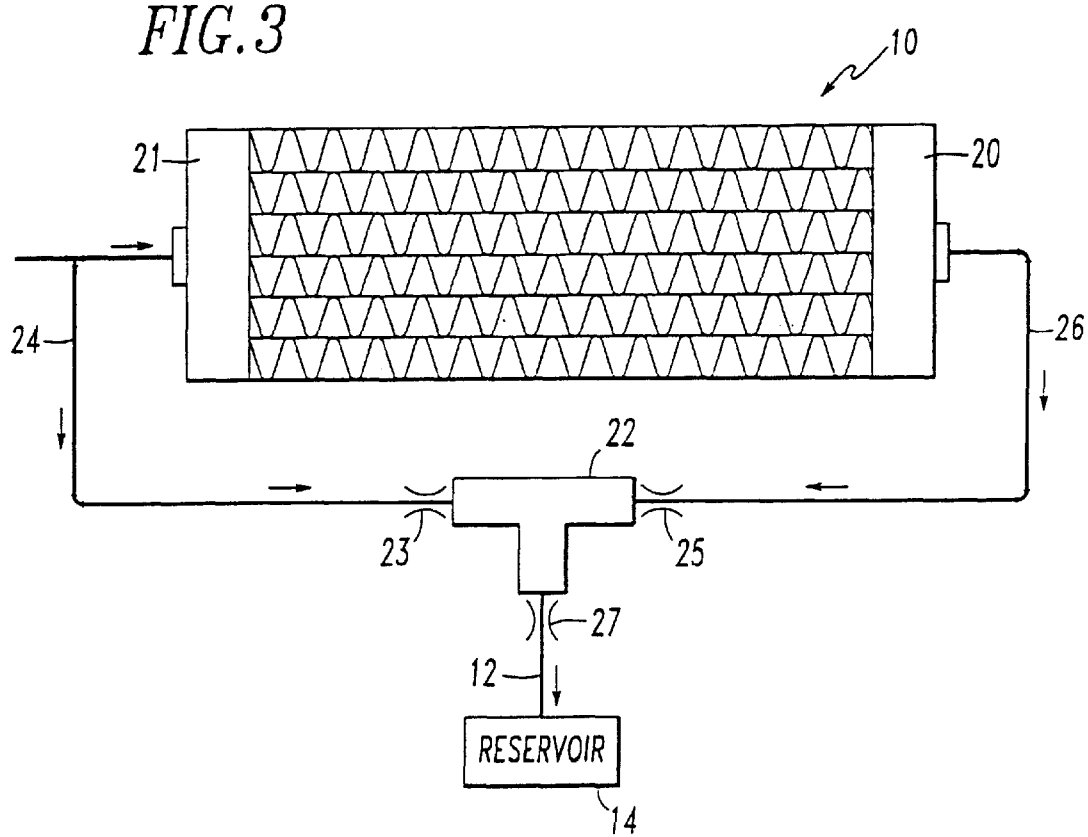
FIG. 3 is a schematic representation of a three-way thermostatically controlled valve providing a mixing application of aftercooler and compressor discharge gases.
Figure 4:
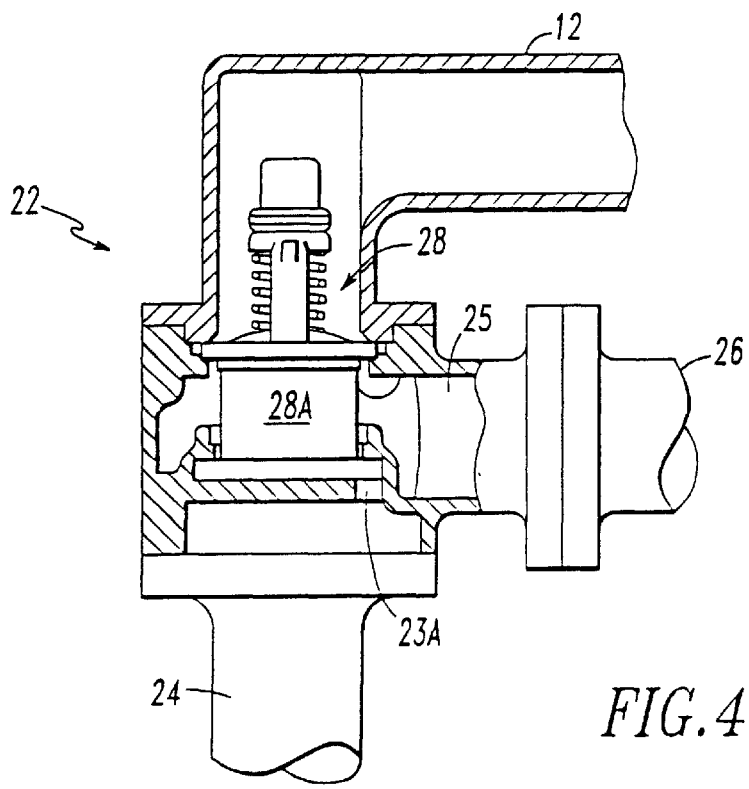
FIG. 4 is a sectional view of a three-way valve and thermostat (in elevation) that can be used in the three-way valve of FIG. 3.

In another embodiment of the invention, air stream temperature is increased by use of a three-way valve 22 that allows bypassing of aftercooler 10, in the manner shown in the drawings FIGS. 3 to 5. In FIG. 3, a first port 23 of valve 22 is located to receive compressed air directly from compressor 1, via a pipe 24, while a second port 25 of the valve 22 is connected to receive cooled air from the aftercooler via a pipe 26. In this manner heated gases flow to and through the third port 27 to the valve 22 to piping 12 leading to reservoir 14 while cooled air with condensate also flows to and through a third port 27 of pipe 12 and the reservoir 14. The hot gases from the compressor thereby warm the cooled gases from the aftercooler to insure a gas temperature above freezing when the gases enter the reservoir 14.

The amount of hot gases needed to insure against freezing in pipe 12 is not substantial and is controlled by the sizes of the port orifices 23 and 25 in valve 22 relative to the pressures of the hot gases issuing from compressor cylinder 11 and the cooled gases exiting aftercooler 10.

In operating in abient conditions above freezing, valve 22 can be "closed" to the hot output of the source of hot compressed air so that aftercooler 10 can perform its normal and efficient function of cooling all of the hot gases received from the source of hot compressed gases. When ambient temperature falls to freezing, valve 22 is operated in an "on" position for at least partial bypassing of aftercooler 10. The valve 22 can be internally thermostatically operated (FIG. 4) to start the mixing process by opening port 23 when temperatures fall to freezing. When temperatures rise above freezing, the thermostat moves to a position to close port 23 so that valve 22 receives only aftercooler gases through valve port 25 for transfer to pipe 12 and reservoir 14.

Valve 22 can operate in a variable manner by use of a thermostat 18 (FIG. 4) located in the valve 22, i.e., the amount of mixing in the valve 22 to maintain an appropriate temperature in pipe 12 can be made directly proportional to ambient temperature. Thus, the colder the temperature outside the valve 22 the more the thermostat closes to the aftercooler to allow more hot air to mix with the aftercooler exhaust pipe 12. In FIG. 6, hot air flow from compressor 1, enters valve 22 via pipe 24, and flows through a small opening 23A in the valve 22 when ambient temperature falls toward freezing (and below). From opening 23A, air flows through a cylinder 28A of thermostat 28 to exhaust pipe 12. When ambient temperature is above freezing, cylinder 28A closes off opening 23A.

FIG. 5 of the drawings shows an embodiment of the invention in which valve 22 can be operated externally by use of a magnet valve 30 pneumatically connected to, valve 22 by a pipe 31. Magnet valve 30 is electrically operated by a switch 32 connected to a valve operating magnet 34. Valve 30 is connected to receive air pressure from the source of the hot compressed air via a pipe 36 which the magnet valve 30 uses as control air to operate three-way valve 22. When switch 32 receives a freezing temperature signal or a close to freezing signal, the switch 32 closes to apply an appropriate voltage to magnet 34. Magnet 34 is energized to operate magnet valve 30 in a manner that applies the air pressure received from the source of hot compressed air to three-way valve 22 to open the same to the hot gases in pipe 36. Hot gases thus join with the cooled gases that enter three-way valve 22 to heat the same. When ambient temperature rises above freezing, switch 32 is opened to deenergize magnet 34 and valve 30 so that three-way valve 22 returns to a condition that closes the three-way valve 22 to the hot gases thereby allowing only cooled gas flow to reservoir 14.

Switch 32 can be operated by temperature signals originating at a location remote from the switch 32. Locomotives generate and use temperature measurements for a variety of reasons. The measurements are usually converted to digital signals for use by computers located in the cabs of locomotives. Switch 32 can be operated by such a digital signal to effect the operation of valve 30.

In another embodiment of the invention (FIG. 6) three-way valve 22 can be located on the "entry" side of aftercooler 10. Again, valve 22 can be operated in the manners described above to bypass aftercooler 10 and thereby prevent freezing of condensate in pipe 12 when ambient conditions are freezing, and restoring the aftercooler to receive the full output of hot gases from a source of hot gases when ambient rises above freezing.

While the presently preferred embodiment for carrying out the instant invention have been set forth in detail above, those persons skilled in the brake control art to which this invention pertains will recognize various alternative ways of practicing the invention without departing from the spirit and scope of the claims appended hereto.

What is claimed is:

1. An apparatus for heating a gas cooled by an aftercooler receiving hot gas from a compressor, said apparatus comprising:

a pipe bypass means connected to receive at least a portion of such hot gas from such compressor for directing said at least a portion of such hot gas around such aftercooler when ambient temperature falls to a freezing level and to a predetermined location receiving cooled gas from such aftercooler, while a remainder of such hot gas is sent to such aftercooler from such compressor for cooling;

a preset safety valve connected to such compressor, with an internal size of said pipe bypass means being such that upon blockage of such aftercooler due to freezing of moisture in such aftercooler, said pipe bypass means will pass hot gas to such predetermined location receiving cooled gases from such aftercooler in an amount sufficient to prevent said safety valve from operating;

such hot gas being effective to mix and thereby heat such cooled gas at such predetermined location receiving cooled gas when ambient temperatures are at freezing levels.

2. The apparatus of claim 1 wherein said pipe bypass means connected to receive hot gas from such source of hot gas and to direct same to a predetermined location receiving cooled gas from such aftercooler, communicates such hot gas in an amount effective to heat such cooled gas exhausting from such aftercooler, and to bypass completely such aftercooler if moisture freezes in such aftercooler.

* * * * *